July 13, 1965 E. R. HASKINS 3,194,890

TWO DIGIT REPERTOIRE DIALING SYSTEM

Filed March 6, 1962 3 Sheets-Sheet 1

INVENTOR.
EDWARD R HASKINS
BY
Paul W Hemminger
ATTORNEY

TWO DIGIT REPERTOIRE DIALING SYSTEM

Filed March 6, 1962 3 Sheets-Sheet 2

July 13, 1965 E. R. HASKINS 3,194,890

TWO DIGIT REPERTOIRE DIALING SYSTEM

Filed March 6, 1962 3 Sheets-Sheet 3

United States Patent Office 3,194,890

Patented July 13, 1965

3,194,890

TWO DIGIT REPERTOIRE DIALING SYSTEM

Edward R. Haskins, Chicago, Ill., assignor to International Telephone & Telegraph Corporation, New York, N.Y., a corporation of Maryland Filed Mar. 6, 1962, Ser. No. 177,851
13 Claims. (Cl. 179—18)

This invention relates in general to an abbreviated dialing system and in particular to a two-digit repertoire dialing system of the type wherein any one of a group of seven-digit or ten-digit telephone numbers may be reached by the dialing of a two-digit code number. Its principal object is to provide a new and improved system of the above character which may be installed in new exchanges or added to existing exchanges with a minimum of wiring changes and equipment additions.

Two-digit repertoire dialing service is offered to telephone subscribers desirous of participating in this service by providing each with the same ten two-digit code numbers to which they may assign any seven-digit or ten-digit telephone numbers which they frequently call. The telephone company, by suitable jumpering or storage arrangements modifies the line circuit of the participating telephone subscriber or modifies the central office equipment so that each time one of the ten two-digit code numbers is dialed, the switching equipment is automatically conditioned to extend a connection to the party corresponding to the multi-digit number assigned the code number dialed.

In known two-digit repertoire dialing systems, a special storage matrix is provided in which a separate section thereof is assigned to each participating subscriber with each section having ten separate compartments therein for storing respective multi-digit numbers. The sections and compartments of the matrix are coded so that the dialing of any one of the ten code numbers causes a readout of the number stored in the proper compartment of the section of the matrix assigned the calling subscriber. The matrix section is selected according to the identity of the calling line and the compartment therein is selected according to the value of the second digit of the code number. This known system necessarily requires a storage matrix large enough to store all of the seven-digit or ten-digit numbers which all of the participating telephone subscribers have selected. Also, this storage matrix is necessarily a part of the central office equipment not readily subject to size variations or wiring or equipment modifications and is, thus complex and costly.

It is an object of the present invention to provide a two-digit repertoire dialing system in which only a minimum of central office equipment is provided and in which apparatus individual to each participating telephone subscriber is added when required. The present invention thus permits a minimum of investment in new exchanges.

In the present invention, the common equipment needed for this abbreviated dialing service consists primarily of standard register equipment, a tone generator which places a tone frequency on the sleeve conductor of the calling line and tone detecting apparatus. The individual equipment consists of a simple multi-section resistor matrix associated with the sleeve conductor of the line of each participating subscriber. In operation, tone is transmitted over the sleeve conductor to the line circuit of the calling line and after passing through the resistor matrix is detected and converted into a seven or ten-digit number which is passed to the noted register equipment for handling in the same manner as if it were dialed completely by the subscriber.

Another object of the present invention is to provide a two-digit repertoire dialing system in which a single tone frequency on the sleeve conductor of the calling line is selectively passed through an associated resistor matrix to provide an indication of a maximum of ten seven-digit or ten-digit telephone directory numbers. A related feature resides in the arrangement wherein the tone appears on a plurality of matrix resistor sections which correspond respectively to the second digits of the two-digit code numbers and which are rendered conductive only when the corresponding digit value of the second digit is dialed.

Still another object of the invention is to provide a two-digit repertoire dialing system in which a group of bus-bars are provided for each digit position of a seven-digit or ten-digit directory number, with each group of bus-bars containing a separate busbar for each digit value. The output of each line matrix section is jumpered to predetermined ones of the busbars in accordance with the individual subscriber selections.

A further object is to provide a two-digit repertoire dialing system wherein participating subscriber changes in the assignment of the code numbers to different multi-digit numbers can be effected by a simple line matrix jumper change.

Still another object is to provide a detector which sequentially scans the noted busbars to detect the appearance of the tone thereon. This detector is arranged to evaluate the tone-marked busbars and to generate a corresponding digit in the form of a two-out-of-five code for transmission to the central office registering apparatus.

A still further object is to provide a two-digit repertoire dialing system in which line and station changes of any of the telephone directory numbers assigned abbreviated dialing is effected without any changes in the matrices or line circuit wiring of the subscribers to the abbreviated dialing service.

Other objects and features of the invention will become apparent and the invention will be best understood when the specification is read in conjunction with the accompanying drawings comprising FIGS. 1 through 3 in which.

Figure 1:
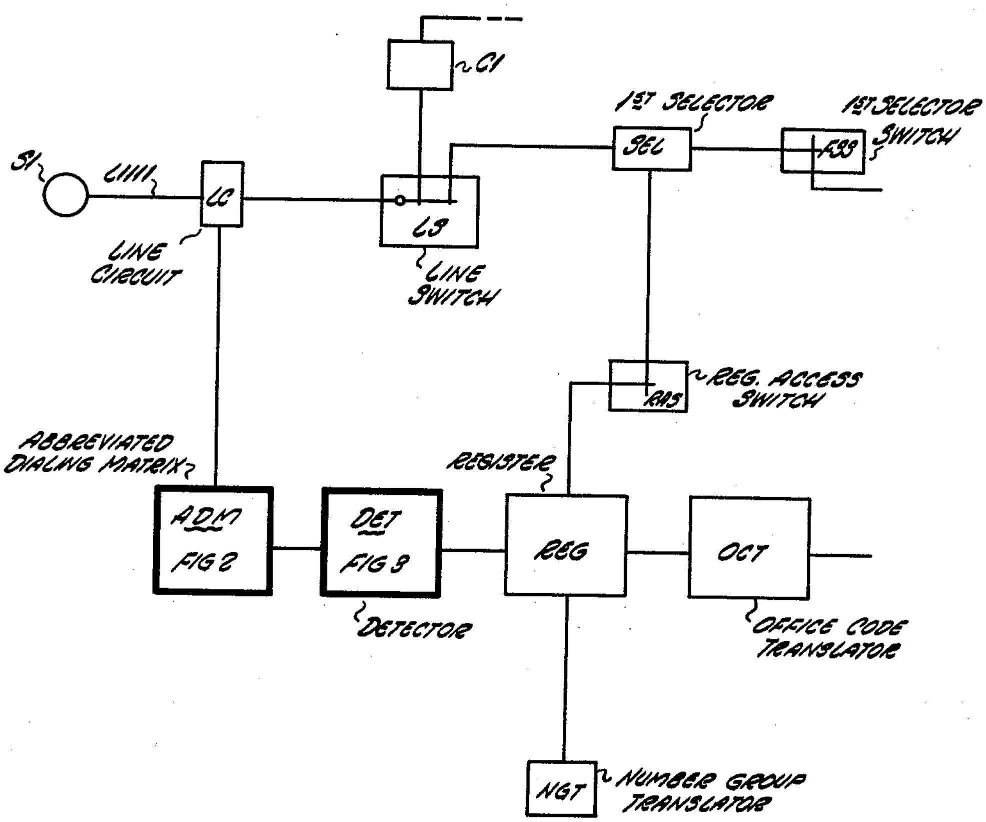
FIG. 1 shows a single line block diagram of a conventional telephone system embodying the invention.

Referring now to FIG. 1 of the drawings, a general description of the operation of the invention will be given. The block diagrams having a heavily inked border are shown in amplified form in FIGS. 2 and 3 of the drawings. The office code translator OCT may be of the type disclosed in U.S. Patent No. 2,998,493 issued August 19, 1961, to J. C. Gibson and the remainder of the telephone system shown in FIG. 1 may be similar to that disclosed in U.S. Patent No. 2,918,533 issued December 22, 1959, to E. J. Leonard et al. Only those parts of FIG. 1 which are necessary for a complete understanding of the invention will be decribed.

It has been found that the average telephone subscriber does not have more than ten telephone numbers which are called frequently enough to be used with abbreviated dialing service. Accordingly, a maximum of ten two-digit code numbers is usually made available for this service although this number could be readily increased whenever required.

For purposes of this disclosure, it is assumed that the first digit of the two-digit code number indexes the repertoire dialing service and that the second digit thereof indexes the particular one of the ten frequently called numbers chosen by he participating telephone subscriber. The first digit of this two-digit code number is chosen as one not used as the first digit of any office code in the exchange providing this repertoire service. For purposes of this disclosure, it is assumed that the digit 9 is available and when dialed, indicates a demand for repertoire service.

Each participating telephone subscriber is provided with a form, in duplicate, having the same ten two-digit code numbers 90 to 99 listed thereon. The subscribers desiring this service assign separate multi-digit telephone numbers to each of the ten code numbers and returns one copy of the list to the telephone company. A copy of the number assignment is retained by the subscriber and is used whenever abbreviated dialing service is dialed.

The telephone company modifies the line circuit of each participating subscriber by connecting jumpers between the associated resistor matrix and the common busbars in accordance with the subscriber's selected assignment. This jumpering arrangement will be described in detail in conjunction with FIG. 2 of the drawings.

A general description of the operation of the system in handling a repertoire type call will now be described.

When the subscriber at station S1 on line L1111 initiates a call, line circuit LC1111, in conjunction with line switch LS, extends a connection to an idle first selector, such as SEL. Thereafter, the connection is further extended automatically through register access switch RAS to register REG and dial tone is then returned to the calling subscriber. The operation of the above noted apparatus is similar to that described in the noted E. J. Leonard et al. patent.

Assuming the subscriber at station S1 wishes to reach telephone number 210–9191 and the subscriber has previously assigned code number 90 to this number, the digits "9" and "0" are dialed. Register REG, through apparatus not shown, recognizes the digit "9" as the first digit of repertoire dialing service and after receiving the digit "0," exercises control over the sleeve conductor of the calling line, the abbreviated dialing matrix ADM and the associated detector DET.

When the register is originally seized, a holding potential is placed on the sleeve conductor of the calling line in a manner well-known. When the register recognizes the called digits as a two-digit code number for repertoire dialing service, the sleeve conductor is transferred from the usual holding potential to an alternate holding potential and a 700 cycle tone is superimposed thereon. This tone appears on the sleeve conductor of the calling line and is extended through line circuit LC1111 to the abbreviated dialing matrix ADM. At the same time, the register REG exercises control over the ADM equipment to select a section of the resistor matrix of LC1111 according to the value of the second digit dialed and to permit the tone to mark the busbars corresponding to the directory number desired. Thereafter, the detector interrogates the ADM equipment and generates a series of two-out-of-five codes which are indicative of the desired telephone number 210–9191. These generated codes are returned to the register REG and are stored in the same register digit stores that a regular telephone number is stored. The register responds to such recordings and extends the connection to the desired line in the manner described in the above-mentioned patents.

It will be noted that line and station number changes do not adversely effect the assignment of frequently called telephone numbers to the ten codes since the output of the ADM equipment, which is stored in the register, is processed by the office code and number group translators.

After the call is detected, the noted transfer of these multi-digit numbers to the register is effected and a connection is thereafter completed, the ADM equipment, the detector and the register apparatus are released and the calling station S1 is connected to the desired line.

Figure 2:
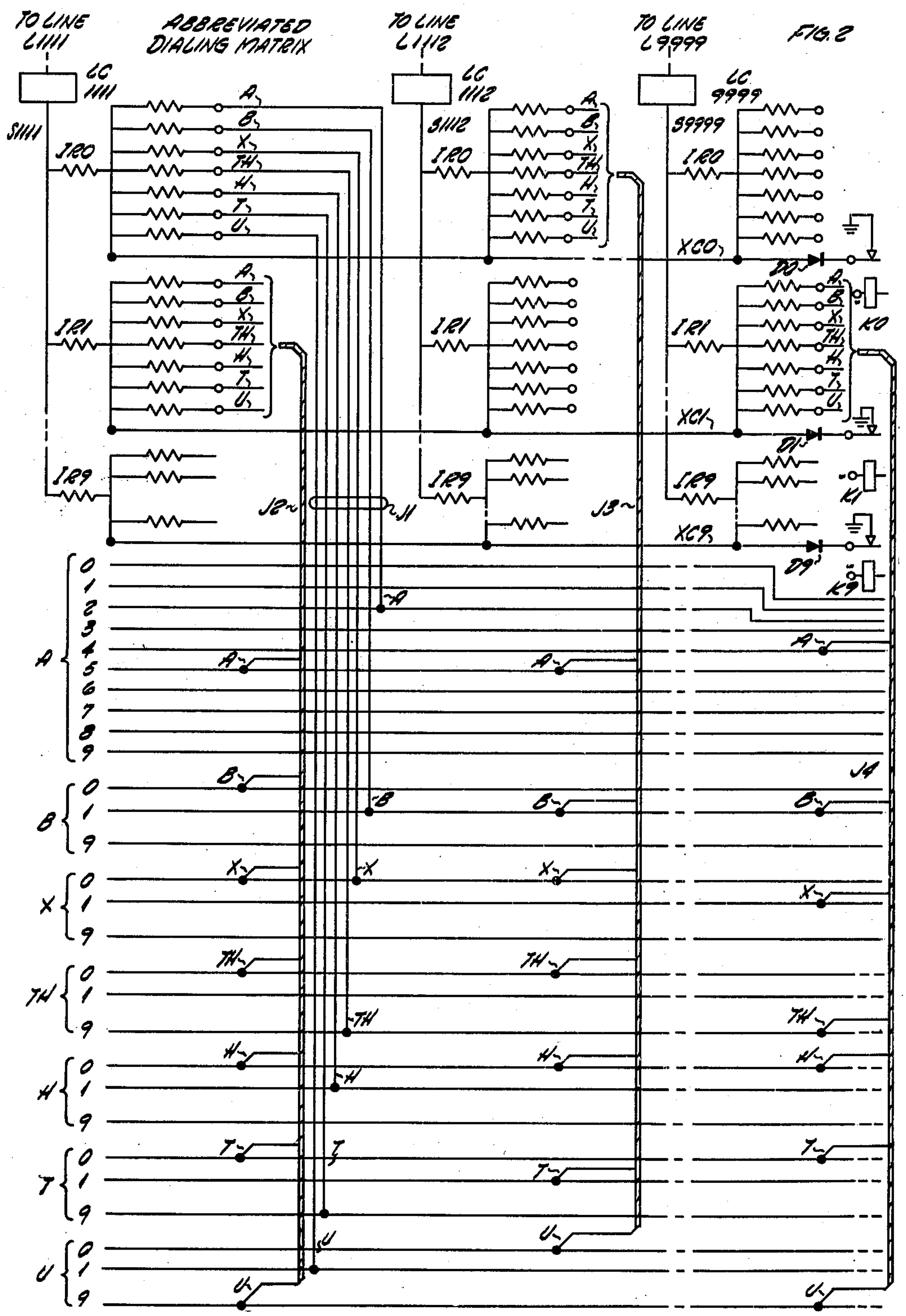
FIG. 2 shows a circuit diagram of the resistor matrix and digit-position busbars jumper interconnected to provide two-digit repertoire dialing service.
Figure 3:
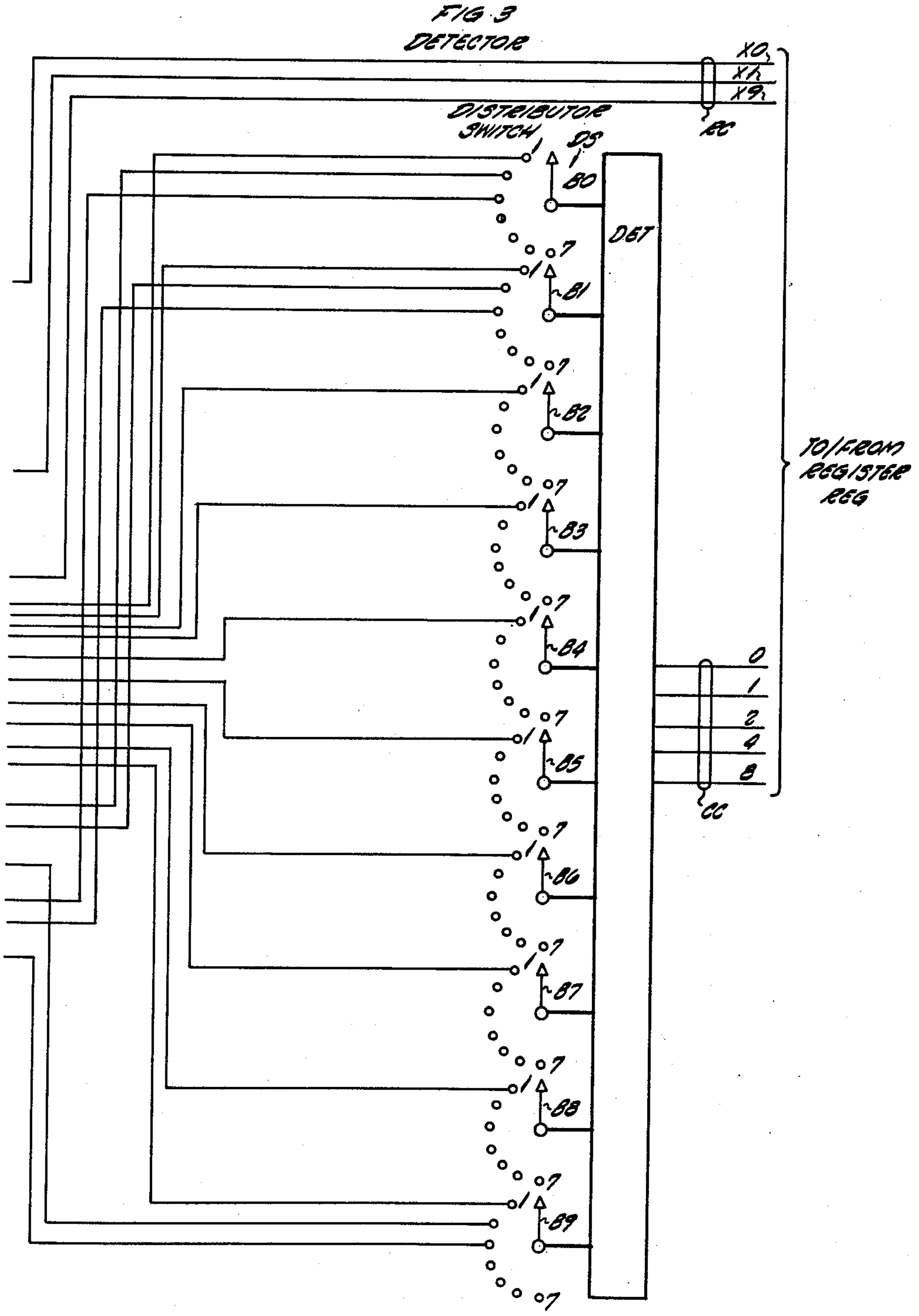
FIG. 3 shows a simplified version of a distributor switch and associated detector for evaluating the information appearing on the noted busbars.

Referring now to FIGS. 2 and 3, a detailed description of the abbreviated dialing matrix ADM and the associated detector DET will be given.

In FIG. 2 of the drawings, the first two lines L1111 and L1112 and the last line L9999 of the 10,000 line office are indicated as lines participating in the two-digit dialing repertoire service. A separate line circuit LC, together with their associated sleeve or control conductor S1111, S1112 and S9999, is shown for each of these lines. Each of these sleeve conductors has ten sections of seven resistors connected thereto through a separate isolating resistor, IR0 to IR9. Those ten sections of resistors correspond respectively to the second digit of the ten two-digit code numbers.

FIG. 2 also discloses seven groups of digit busbars, A, B, X, TH, H, T and U which correspond respectively to the three-digit office code and the four digit local number. Each of these groups of busbars include ten individual busbars which correspond respectively to the digit values 0–9.

Assume that the subscriber at line L1111 has assigned the seven-digit director number 210–9191 to the code number 90, the seven-digit directory number 500–0009 to code number 91, and other seven-digit numbers to the remaining two-digit code numbers. The telephone company, by jumper J1, interconnects the first section of the resistor matrix associated with sleeve conductor S1111 to the busbars which correspond to the seven-digit number assigned code 90. Similarly, the second section of the resistor matrix associated with sleeve conductor S1111 is connected, by jumper J2 to the busbars which correspond to the telephone number assigned code 91. The remaining sections of the resistor matrix groups are jumper-connected to the busbars corresponding to the multi-digit numbers assigned the two digit code numbers 92–99. Since the number 210–9191 is assigned code number 90, the seven resistors in the first section of the resistor matrix are connected to the seven sets of busbars. The first conductor in jumper J1 is assigned the third busbar in the A group of busbars since the first digit is a "2." The second conductor is connected to the second busbar in the B group of busbars since the second digit is "1." The remaining conductors of jumper J1 are connected to other busbars in accordance with the remaining digits in the telephone number 210–9191. In the same manner, the individual conductors in jumper J2 are connected.

Jumpers J3 and J4 are shown associated with lines L1112 and L9999, respectively. Jumper J3 is shown to correspond to the code digit 90 (directory number 510–0010) while Jumper J4 is shown associated with the code number 91 (directory number 411–9009). While each of the lines are shown connected to different busbars, it is possible that two separate subscribers would assign the same code to the same telephone number. In that case, the same busbars would be connected to the same group of resistors associated with each of these lines.

Ten matrix relays X0 through X9 are associated with the matrix ADM and are controlled from the register REG. Relay X0 operates in response to the dialing of the digit 0 of the two-digit code number 90; relay X1 operates in response to the dialing of the two digit code number 91; and relay X9 operates in response to the dialing of the two-digit code number 99. Contacts of each of these relays normally maintain a ground potential through a rectifier on each of the respective conductors XC0, XC1 and XC9 which are connected in common to all of the respectively corresponding resistor matrices sections associated with each line participating in this repertoire dialing service. Thus, the first resistor matrix section of each of the lines L1111, L1112 and L9999 are connected in common through rectifier D0 to ground through break contacts of relay X0. Similarly, the second resistor matrix section of each of these lines are connected in common through rectifier D1 to ground through contacts on relay X1.

In the normal condition when none of the matrix relays X0–X9 are operated, each of the isolating resistors, IR0–IR9, associated with each line are maintained at ground potential through a rectifier. When tone appears on the sleeves of any of these lines, it is shunted to ground on the negative or positive half cycles, as determined by the polarity of the rectifiers D0–D9. Accordingly, on every repertoire type call, tone frequency of a predetermined polarity appears on the output of the seven resistors in each matrix section. This tone frequency is extended to the bus-bars according to the connections of the conductors in the jumpers J1–J4.

When any one of the matrix relays X0–X9 is operated, ground potential is removed from the corresponding one of the common conductors XC0–XC9. This permits both the negative and positive half cycles of the tone frequency appearing on the sleeve conductors S1111–S9999 to be passed through the resistor matrix section that corresponds to the relay operated. Thus, both half cycles of the tone frequency appears on certain busbars in accordance with (1) the jumpering connections, (2) the resistor matrix section associated with the operated matrix relay and (3) the particular sleeve conductor to which the tone is applied.

Referring now in particular to FIG. 3 of the drawing, the operation of the tone detector DET, shown in block diagram form, will be described briefly. This detector is arranged to respond only to complete cycles of tone frequency appearing on the busbars. The detector may include a well-known relay configuration of ten relays corresponding to the ten busbars of each group of busbars for converting a decimal indication into a two-out-of-five code indication. This two-out-of-five code indication appears in coded combination on the wires 0, 1, 2, 4 and 8 of cable CC and is forwarded to register REG for recording in the digit stores in the register as previously noted.

A distributor switch DS is associated with the detector DET and with the seven sets of digit busbars A, B, X, TH, H, T and U. This switch is shown as having ten levels with each level having seven bank contacts therein. The ten digit "A" busbars are individually connected to the first bank terminal of each of the switch levels; the ten digit "B" busbars are individually connected to the second bank terminal of the switch levels; and the remaining digit busbars are connected to the remaining bank terminals in the same manner.

When the sleeve of the calling line is transferred from holding ground potential to a modified holding potential having tone thereon, the distributor switch DS is operated in the well-known manner to successively scan its bank contacts. In this manner, the "A" digit is determined according to the particular one of the ten busbars of the digit "A" busbar group having a complete cycle of tone frequency thereon. The remainder of the digits B, X, TH, H, T and U are determined in a similar manner.

Assuming that the two-digit code number 90 is dialed, tone frequency appears on sleeve conductor S1111 as herein before noted. At the same time, matrix relay X0 is operated and ground is removed from conductor XC0. The complete cycle of tone on the sleeve is then passed through isolating resistor IR0 to each of the seven resistors in the first section of the resistor matrix and appears on busbars A2, B1, X0, TH9, H1, T9 and U0. The tone is effectively shunted on negative half cycles by rectifiers D1–D9 through respectively corresponding isolating resistors IR1–IR9 associated with sleeve conductor S1111. Thus, while all busbars connected to the resistor matrix associated with line circuit LC1111 have negative half cycles of tone thereon, a complete cycle of tone appears only on the busbars according to the jumper interconnections associated with the selected section of the resistor matrix.

At this time, control from the register REG causes distributor switch DS to advance its brushes B0–B9 to bring them into position 1. Equipment in the detector then detects which of the "A" busbars 0 to 9 has a complete cycle of tone frequency thereon. This detector then converts this indication into a two-out-of-five code as noted. Immediately after the two-out-of-five code is generated and forwarded to the register, the brushes of distributor switch DS advance one step into association with the second bank terminals of each of the ten levels. The detector thereupon determines which of the "B" busbars has complete cycles of tone frequency thereon and generates a corresponding two-out-of-five code for transmission to the register.

The above described operation of the distributor switch DS and the tone detector DET is repeated until all of the busbars associated with the remaining digits are evaluated and a corresponding code generated.

The seven individual two-out-of-five code combinations comprise the directory number of the frequently called telephone number which the subscriber at station S1 on L1111 assigned to the two-digit code number 90. These seven individual two-out-of-five codes are stored in the register and through normal register operation are handled by the office code transistor and the number group translator. The output of these translators are used to control the establishment of a connection to the desired called line in the usual register-translator manner.

Other embodiments eliminating the noted rectifiers D0 to D9 are equally suitable. In such cases, only those busbars connected to the selected section of the resistor matrix of a calling line have any tone thereon since all other busbars are ground connected through contacts on the unoperated matrix relays. Additionally, other types of distributor switches and detectors could be used equally well to detect marked ones of the busbars.

While the principles of the invention have been described above in connection with specific apparatus and applications, it is to be understood that this description is made only by way of example and not as a limitation on the scope of the invention.

What is claimed is:

1. An abbreviated dialing system for converting multi-digit code numbers received over any one of a plurality of calling lines into respectively corresponding multidigit telephone numbers assigned to said code numbers, a plurality of resistor matrix means associated with respective ones of said lines, a plurality of sections in said matrix corresponding respectively to said code numbers, means for controlling the section of the matrix means corresponding to the code number received over a calling line by passing a marking signal through the section of the matrix means corresponding to the received code number and excluding the marking signal from the remaining sections of the matrix means to provide markings indicative of the telephone number assigned to the received code, and means for scanning all of said matrix means to detect said markings and to generate a corresponding telephone number.

2. An abbreviated dialing system as set forth in claim 1 wherein said means for controlling said matrix means includes means for transmitting signals to a plurality of matrix outputs equal in number to the number of digits in said corresponding telephone number.

3. An abbreviated dialing system for converting multi-digit code numbers transmitted over any one of a plurality of calling lines into respectively corresponding multi-digit telephone numbers assigned to said code numbers and indicative of a called line, a plurality of matrix means associated with respective ones of said lines, a plurality of digit identifying busses common to all of said matrix means, means responsive to the transmission over any calling line of any said code number for controlling the matrix means of the calling line to energize said common busses in accordance with the telephone number assigned the transmitted code, and means responsive to the said energization for establishing a connection between the calling line and the called line indicated by said corresponding telephone number.

4. An abbreviated dialing system as set forth in claim 3 wherein said means for establishing a connection includes means for generating a two-out-of-five code signal for each digit of the corresponding telephone number.

5. An abbreviated dialing system for converting multi-digit code numbers received over any one of a plurality of lines into respectively corresponding multi-digit telephone numbers assigned said codes, matrix means associated with each of said lines and having sections therein corresponding respectively to the said code numbers, separate busses for each digit value of each digit of any said multi-digit telephone number, means for connecting the output of each of said matrix sections to the said individual busses in accordance with the said assignment of telephone numbers to said code numbers, receiving means responsive to the receipt of any of said code numbers for transmitting a first signal to all said sections of the matrix, means of the calling line, means for conditioning the section of each matrix means corresponding to the code number received to pass the said first signal to the said individual busses connecting the conditioned section of the calling line, and means associated with the said busses for detecting the said first signal thereon and for generating a corresponding multi-digit telephone number.

6. An abbreviated dialing system as set forth in claim 5 wherein the said sections comprise a common input and a plurality of outputs, the said outputs corresponding in number to the number of digits in the multi-digit telephone number.

7. An abbreviated dialing system as set forth in claim 5 wherein said first signal comprises an alternating current signal and wherein each said section includes rectifier means for shunting one half cycles of said signal when the associated section is not conditioned to pass said first signals.

8. In an abbreviated dialing system as set forth in claim 5, individual blocking means associated with each of said sections for blocking the passage of signals therethrough, and the said means for conditioning the said sections including means for disabling the said individual blocking means.

9. An abbreviated dialing system as set forth in claim 5 wherein said code number comprises two digits and wherein said multi-digit telephone number comprises seven digits.

10. An abbreviated dialing system as set forth in claim 9 wherein the said sections correspond respectfully to the second digit of each said code number and wherein the said means for conditioning each section corresponds respectively to the said second digit.

11. An abbreviated dialing system as set forth in claim 5 wherein the said means for detecting a said first signal comprises scanning means for successively scanning groups of said busses.

12. An abbreviated dialing system as set forth in claim 11 wherein switch means are provided for connecting the said detecting means to the said groups of busses step by step.

13. An abbreviated dialing system as set forth in claim 5 wherein each said section comprises a plurality of resistors having one end connected to the associated line and the other end connected to said busses and wherein isolating means is provided for isolating the sections associated with any one line from each other.

References Cited by the Examiner

UNITED STATES PATENTS

| | | | |
|---|---|---|---|
| 2,891,114 | 6/59 | Villmann et al. | 179—90 |
| 2,951,908 | 9/60 | Malthaner et al. | 179—18 |

ROBERT H. ROSE, *Primary Examiner.*

WALTER L. LYNDE, *Examiner.*